United States Patent [19]

Szymczak et al.

[11] Patent Number: 4,925,220
[45] Date of Patent: May 15, 1990

[54] TUBULAR JOINT

[75] Inventors: Edward J. Szymczak, Spring; Arthur H. T. Chin, Houston, both of Tex.

[73] Assignee: Cameron Iron Works U.S.A., Inc., Houston, Tex.

[21] Appl. No.: 285,659

[22] Filed: Dec. 16, 1988

[51] Int. Cl.$^5$ .............................................. F16L 13/14
[52] U.S. Cl. .................. 285/382.4; 285/331; 285/351; 285/393; 29/523
[58] Field of Search ............... 285/370, 371, 369, 382, 285/382.4, 382.5, 351, 397, 398, 393, 222, 258, 331; 29/523; 166/379, 380, 206, 207, 208

[56] References Cited

U.S. PATENT DOCUMENTS

| | | | |
|---|---|---|---|
| 2,092,358 | 9/1937 | Robertson | 285/382.4 |
| 2,934,360 | 4/1960 | Castellanos | 285/382.4 |
| 3,584,903 | 6/1971 | Pritchard | 285/382.4 |
| 4,388,752 | 6/1983 | Vinciguerra et al. | |
| 4,593,448 | 6/1986 | Ferrari Aggradi et al. | 285/382.5 |
| 4,648,626 | 3/1987 | Vinciguerra et al. | 285/382.4 |
| 4,662,663 | 5/1987 | Schmitz | |
| 4,749,047 | 6/1988 | Taylor | |
| 4,759,409 | 7/1988 | Gullion | 285/382.4 |
| 4,791,796 | 12/1988 | Ford | |
| 4,791,987 | 12/1988 | Cassity et al. | |
| 4,805,430 | 2/1989 | Schmitz et al. | 29/523 |

FOREIGN PATENT DOCUMENTS 373989  11/1930  United Kingdom ............... 285/222

Primary Examiner—Dave W. Arola
Assistant Examiner—Carol I. Bordas

[57] ABSTRACT

An improved tubular joint including an inner tubular member, an outer tubular member having a central bore therethrough, a counterbore extending from the open end of the counterbore and terminating in a shoulder between the counterbore and the central bore, and internal threads on the outer end of the counterbore, a sleeve positioned within the counterbore, a retainer ring threaded into the counterbore threads and retaining the sleeve within the counterbore, ribs on the interior of the sleeve and a seal between the exterior of the sleeve and the interior of the counterbore so that pressure forming of the inner tubular member forms it into tight gripping and sealing engagement with the sleeve and the sleeve is sealed within the outer tubular member to form a completed improved tubular joint.

13 Claims, 3 Drawing Sheets

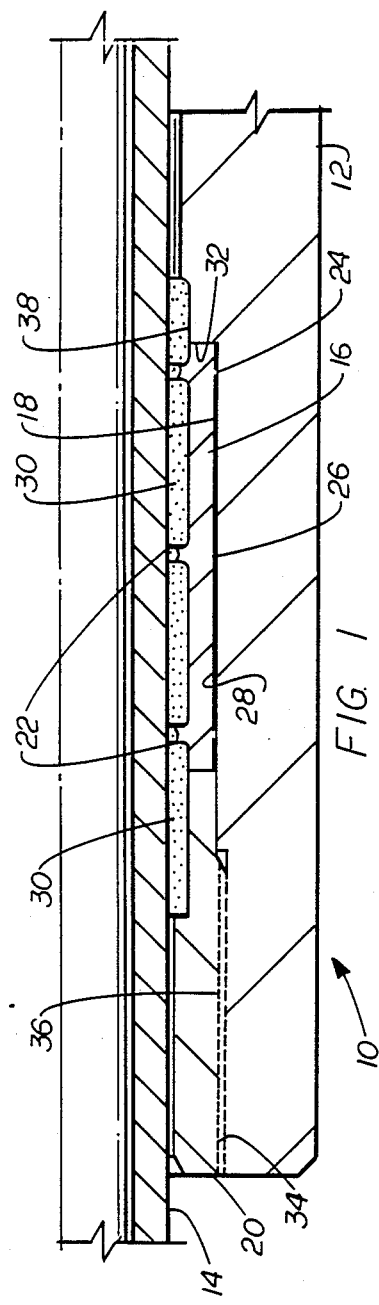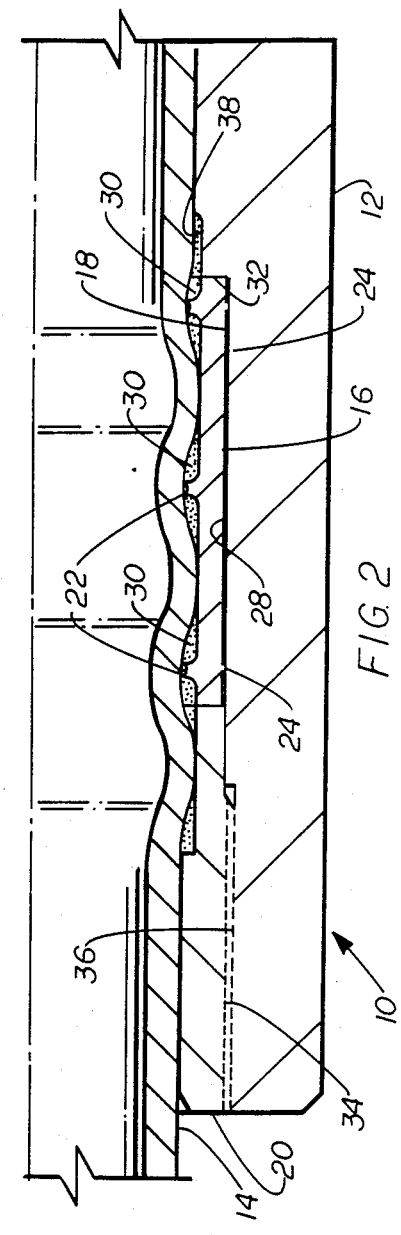

TUBULAR JOINT

BACKGROUND

The present invention relates to an improved tubular joint or connection in which two tubular member can be brought into tight gripping and sealing engagement with each other in a well bore or other location accessible through the tubular members.

Tubular members have been joined together in well bores and other inaccessible locations in the past as shown in U.S. Pat. No. 4,662,663 wherein one of the tubular members is cold forged or formed radially outwardly into engagement within a second member surrounding the one member responsive to pressure developed within a pressure actuated forming device. In this patent it is suggested that a suitable volume compensating material be used since the connection is being made in an underwater location and water trapped within the grooves into which the inner member is to be pressure formed could prevent proper engagement and sealing.

U.S. Pat. No. 4,388,752 discloses another type of device for the pressure forming of one tubular member into a second tubular member surrounding the portion of the one tubular member being formed.

U.S. patent applications, Ser. Nos. 07/114,422, filed Oct. 28, 1987 now U.S. Pat. No. 4,791,796; 07/098,197, filed Sept. 9, 1987; 07/106,803, filed Oct. 13, 1987 now U.S. Pat. No. 4,805,430; and 07/217,158, filed July 11, 1988 now U.S. Pat. No. 4,827,748 all disclose devices to be used in the pressure forming of one tubular member radially outward into tight sealing engagement within a second tubular member.

U.S. patent applications, Ser. Nos. 07/044,410, filed Apr. 30, 1987 now U.S. Pat. No. 4,791,987; 07/044,409, filed Apr. 30, 1987; and 07/044,581, filed Apr. 30, 1987 now U.S. Pat. No. 4,749,047 all disclose various structures which are formed into a tubular joint within a well bore.

In the above systems, a tubular joint is provided which is satisfactory except that the well housing having the sealing and gripping lands and grooves is generally not reusable if such joint has to be disconnected.

SUMMARY

The present invention provides an improved tubular joint or connection in which the pressure formed joint includes a sleeve positioned between the tubular members and carried by the outer member on its interior and having means for sealing against and for releasably securing it to the outer member and also having means for engaging the inner member in sealing and gripping engagement when it is pressure formed radially outward into engagement with the interior of the sleeve.

An object of the present invention is to provide an improved tubular joint which may be assembled in a well bore through pressure forming the inner tubular member radially outward so that there is a sealing and gripping engagement with the outer member and allowing the pressure formed connection to be disconnected in a manner to allow the reuse of the outer member.

Another object of the present invention is to provide an improved tubular joint in which the outer member is not excessively deformed during the pressure forming of the inner member into its sealing and gripping engagement with the outer member.

A further object is to provide an improved tubular joint which can be joined within a well bore or other remote location responsive to pressure forming and which can subsequently be disconnected to allow reuse of the outer tubular member.

Still another object is to provide an improved tubular joint which is readily pressure formed and includes hardened gripping and engaging sealing ribs providing the gripping and sealing engagement with the inner tubular member.

BRIEF DESCRIPTION OF THE DRAWINGS

These and other objects and advantages are hereinafter set forth and explained with reference to the drawings wherein:

FIG. 1 is a partial sectional view of one form of the preferred joint of the present invention prior to forming.

FIG. 2 is another partial sectional view of the joint of FIG. 1 after forming has been completed.

DESCRIPTION OF THE PREFERRED EMBODIMENTS

Figure 7:
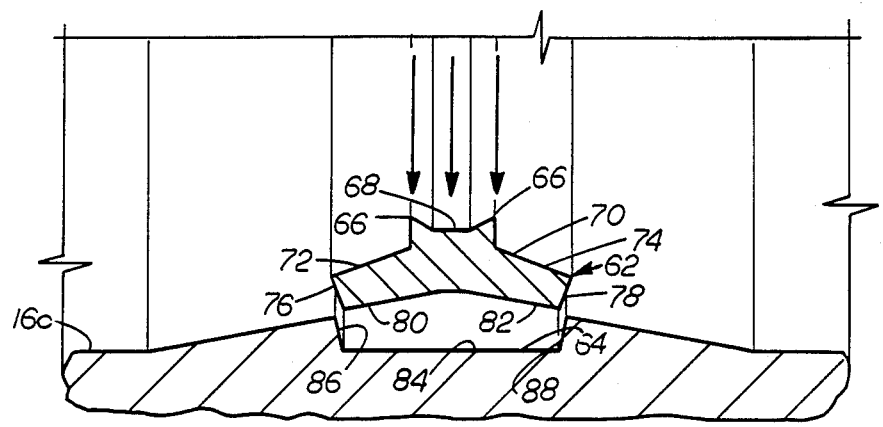
FIGS. 7 and 8 are detailed sectional views illustrating the original emplacement of the hardened insert into the sleeve during manufacture and FIG. 9 is a similar view illustrating the position which the insert takes with respect to the inner member after forming.

As shown in FIGS. 1 and 2, improved tubular joint 10 includes the outer tubular member 12, the inner tubular member 14 and the sleeve 16 which is positioned within recess or counterbore 18 on the interior of outer member 12 with retainer 20 being threaded within outer tubular member 12 to retain sleeve 16 in its desired position. Sleeve 16 includes a plurality of gripping and sealing ribs 22 extending inwardly and suitable sealing means 24 as hereinafter described for sealing between the exterior surface 26 of sleeve 16 and the interior surface 28 of outer tubular member 12. A suitable volume compensating material 30 is provided on either side and between the gripping and sealing ribs 22. Syntactic foam which includes a multiplicity of microspheres in an epoxy matrix has been found to be a suitable volume compensating material. It will exclude water from the annular volumes into which inner tubular member 14 is to be formed and will readily crush without offering sufficient resistance to the forming to change its effectiveness.

Sleeve 16 is positioned within recess 18 against shoulder 32 which is formed between the inner end of counterbore 18 and central bore 13 extending through member 12. The engagement of retainer 20 against the outer end of sleeve 16 holds sleeve 16 in tight abutment with shoulder 32. Retainer 20 includes external threads 34 which engage internal threads 36 at the outer end of recess 18. Retainer 20 is threaded tightly against sleeve 16 to retain it in position within recess 18 and in engagement with shoulder 32 as shown in FIG. 1. In this position of sleeve 16, its external sealing means 24 (hereinafter discussed) are in sealing engagement with the inwardly facing surface of recess 18 and its gripping and sealing ribs 22 which are positioned on the interior of sleeve 16 with volume compensating material 30 between and on the inner and outer sides of ribs 22 including secondary recess 38 which is positioned on the interior of outer tubular member 12 immediately inward of shoulder 32.

When sleeve 16 has been positioned within outer tubular member 12 as shown, then inner tubular member 14 can be positioned therein in its desired position. Thereafter, a suitable forming tool is positioned within inner tubular member 14 and it exerts sufficient radial force on the interior of inner tubular member 14 to cause it to be displaced radially outward into engagement with gripping and sealing ribs 22. Member 14 will be displaced radially outward between ribs 22 into engagement with or close to engagement with the interior surface of sleeve 16 between ribs 22. When inner tubular member 14 has been displaced in this manner to the position shown in FIG. 2, the forming tool is removed and the tubular connection is completed and may be put in service in any desired manner. Sealing means 24 provide the seal between the exterior of sleeve 16 and the interior of outer tubular member 12 to avoid leakage of fluids contained within members 12 and 14 through the potential leakage path between the exterior of sleeve 16 and the interior of outer tubular member 12.

In FIGS. 3 through 6 sleeve 16 is illustrated having different suggested forms of external sealing means 24 for sealing against the interior surface 28 of recess member 12. Sealing means 24 shown in FIG. 3 includes sharpened ribs 40 on the exterior of sleeve 16a at positions radially outward from the end ribs 22 and, if desired, sharpened ribs 40 may be positioned on the exterior of sleeve outward from all of ribs 22. The pressure forming of inner tubular member 14 creates sufficient radial force on sleeve 16a to cause ribs 40 to be forced outward into gripping and sealing engagement with interior surface 28 of outer tubular member.

Figure 4:
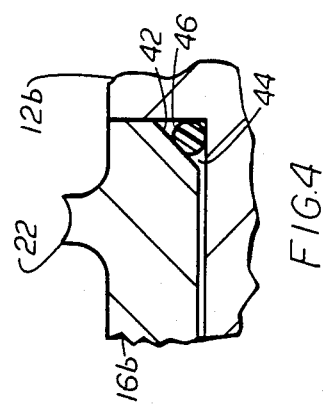
FIGS. 3, 4, 5, and 6 are partial detailed sectional views illustrating the suggested forms of sealing between the sleeve and the outer tubular member.

FIG. 4 illustrates a modified form of sealing means 24 which includes beveled surface 42 on the inner exterior end of sleeve 16b to form annular sealing space 44 in which resilient sealing ring 46 is positioned. Sealing ring 46 may be any suitable resilient sealing ring, such as an 0 ring, with its material being selected to withstand the fluids and conditions of service of the completed connection.

Figure 5:
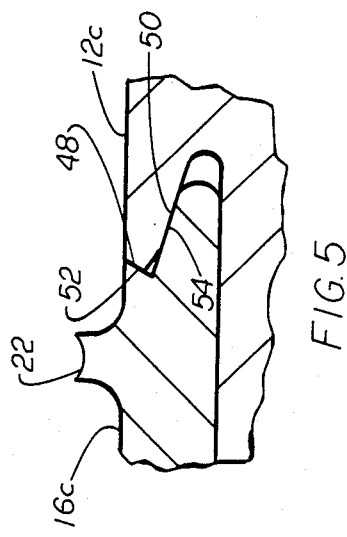

Another form of sealing means 24 is shown in FIG. 5 wherein sleeve 16c is provided with the configuration shown on its inner end. Such configuration includes tapered surface 48 which tapers radially outward and in the direction toward retainer 20 and tapered surface 50 which tapers radially outward and in the direction away from retainer 20. Recess 18c is provided with mating tapered surfaces 52 and 54 against which tapered surfaces 48 and 50 are urged by retainer 20 to provide a sealing engagement between the inner end of sleeve 16c and the interior of outer tubular member 12c.

Figure 6:
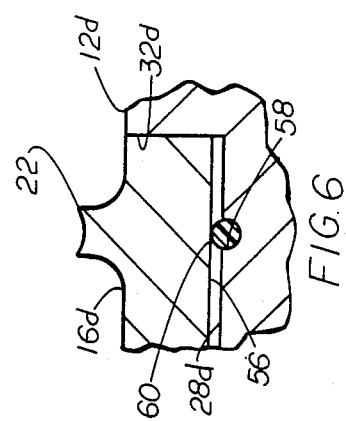
Figure 3:
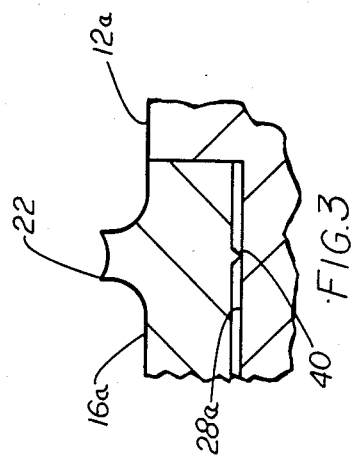

In the form of sealing means 24 illustrated in FIG. 6, sleeve 16d has flat exterior surface 56 and inner surface 28d of member 12d includes annular recess 58 in which resilient sealing ring 60, such as an 0 ring is positioned. While it is contemplated that a metal-to-metal sealing between the inner end of sleeve 16 and shoulder 32 may be provided, the addition of sealing means 24 as shown in FIGS. 3 to 6 is suggested to ensure proper sealing at of the completed connection at all times.

Figure 8:
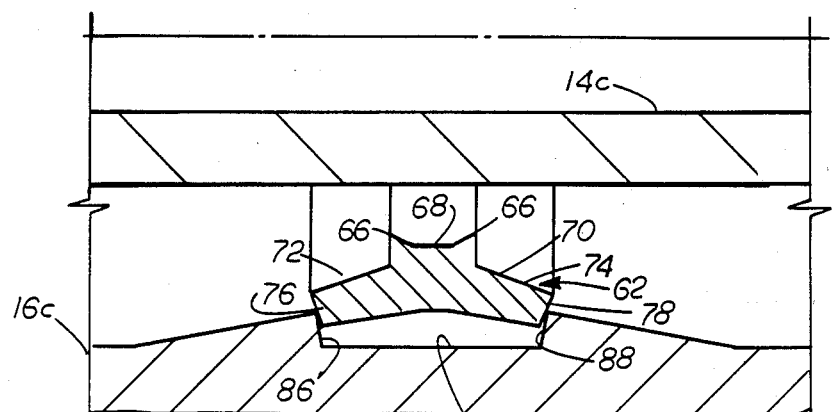
Figure 9:
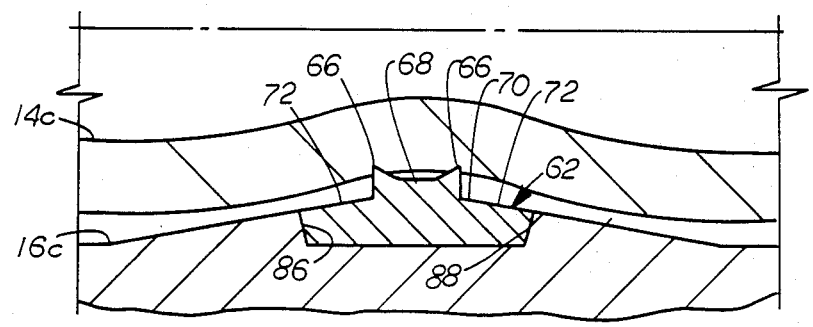

While ribs 22 are shown in FIGS. 1 and 2 as being integral with sleeve 16, it is contemplated that in some connections a different material, such as a harder material, could be used advantageously for ribs 22 but it would not be desirable generally to make the whole of sleeved 16 from such harder material. For this reason sleeve 16e as shown in FIGS. 7, 8 and 9 includes hardened insert 62 and sleeve 16e includes recess 64 for receiving insert 62, both as hereinafter described. Hardened insert 62 is annular in shape and includes inner projecting spaced apart ribs 66 separated by recess 68, and annular body 70. Body 70 includes inner tapered surfaces 72 and 74 which taper toward opposite ends of body 70 and radially outward, end faces 76 and 78 which taper radially outward and toward the central portion of the body and outer tapered surfaces 80 and 82 which taper radially outward and in a direction toward the end of body 70 so that they diverge outwardly to provide a concave recess on the exterior of body 70. Recess 64 on the interior of sleeve 16e includes inner cylindrical surface 84 and end faces 86 and 88 which taper radially inward and in opposite directions away from each other so that the surfaces diverge inwardly.

Insert 62 is formed into recess 64 in sleeve 16e in the factory or other suitable location at which equipment is available for the pressure forming of insert 62 into recess 64. Insert 62 is formed from the position shown in FIG. 7 to the position as shown in FIG. 8 so that it is secured within recess 64 and further so that its ribs 66 have a diameter larger than the outer diameter of tubular member 14e so that there is no interference in assembling the components of the connection prior to the pressure forming of the completed joint. In this preformed position, insert 62 is positioned within recess 64 as shown in FIG. 8 with its end faces 76 and 78 in tight engagement with end faces 86 and 88, respectively, of recess 64 so that it is not displaced during assembly of the components prior to pressure forming.

The completion of the connection or joint is illustrated in FIG. 9. The pressure forces exerted on the interior of inner tubular member 14e are sufficient to displace insert 62 completely into recess 64 and to flatten body 70 so that it axially forms metal-to-metal sealing between mated surfaces 76 and 86 and between surfaces 78 and 88 and engages surface 84 and end faces 86 and 88 of recess 64 as shown. In this position insert 62 has become a portion of sleeve 16e and its hardened material provides a better engagement of ribs 66 against the exterior of inner tubular member 14e as seen in FIG. 9.

One of the primary advantages of the improved joint of the present invention is that the outer tubular member may be salvaged and reused by the removal of the inner tubular member and sleeve. This is accomplished by the unthreading of retainer 20 from outer tubular member 12 which allows the withdrawal of sleeve 16 and inner tubular member 14 from within outer tubular member 12. Since substantially all of the deformation takes place in the deformation of inner tubular member, outer tubular member is not deformed sufficiently to prevent its reuse in another joint which is similarly formed after the original formed joint is disassembled as described above.

What is claimed is:
1. A tubular joint comprising
an outer tubular member having a central bore and a counterbore extending therein and terminating in a shoulder between the counterbore and the central bore,
an inner tubular member,
a sleeve positioned within said counterbore of said outer tubular member,
means for retaining said sleeve within said counterbore, means on the interior of said sleeve for gripping and sealing against the exterior of said inner tubular member when it has been pressure formed outwardly into engagement with the sleeve gripping and sealing means, said engagement between the inner tubular member and the sleeve being the sole means securing said inner tubular member to said outer tubular member, and means for gripping and sealing engagement between said sleeve and the interior of said counterbore in said outer tubular member.

2. A tubular joint according to claim 1 wherein said retaining means includes
a retainer ring having external threads, and
internal threads in said inner tubular member counterbore into which said retainer ring is threaded to retain said sleeve within said counterbore.

3. A tubular joint according to claim 1 wherein said sleeve gripping and sealing means includes
a plurality of annular ribs extending inwardly from the interior surface of said sleeve.

4. A tubular joint according to claim 3 including
volume compensating means positioned between said annular ribs to avoid interference with the proper pressure forming of the inner tubular member into gripping and sealing engagement with said sleeve.

5. A tubular joint according to claim 1 wherein said sleeve gripping and sealing means includes
a plurality of insert rings of hard metal,
each of said insert ring being positioned within an internal recess in said sleeve.

6. A tubular joint according to claim 1 wherein said sealing means between the exterior of said sleeve and the interior of said outer tubular member includes
an external sharpened rib on said sleeve for providing sealing engagement with interior of said inner tubular member.

7. A tubular joint according to claim 1 wherein said sealing means between the exterior of said sleeve and the interior of said outer tubular member includes
a resilient sealing ring positioned between said sleeve and said outer tubular member.

8. A tubular joint according to claim 7 wherein
said resilient sealing ring is positioned in a recess on the interior surface of said counterbore in said outer tubular member.

9. A tubular joint according to claim 7 including
a bevel on the inner exterior end of said sleeve,
said resilient sealing ring positioned in the space between said bevel and said outer tubular member.

10. A tubular joint according to claim 1 wherein said sealing means between the exterior of said sleeve and the interior of said outer tubular member includes
at least one tapered surface on the inner end of said sleeve, and
a mating tapered surface on said outer tubular member for engagement by said tapered sleeve surface for sealing engagement therebetween.

11. A tubular joint comprising
an outer tubular member having a central bore and a counterbore extending therein and terminating in a shoulder between the counterbore and the central bore,
an inner tubular member,
a sleeve positioned within said counterbore of said outer tubular member,
means for retaining said sleeve within said counterbore,
means on the interior of said sleeve for gripping and sealing against the exterior of said inner tubular member when it has been pressure formed outwardly into engagement with the sleeve gripping and sealing means,
said engagement between the inner tubular member and the sleeve being the sole means securing said inner tubular member to said outer tubular member,
means for sealing between the exterior of said sleeve and the interior of said counterbore in said outer tubular member,
said sleeve griping and sealing means includes
a plurality of insert rings of hard metal,
each of said insert rings being positioned within an internal recess in said sleeve,
said insert rings each includes
a body, and
inwardly extending ribs which are spaced apart by a recess.

12. A tubular joint according to claim 11 wherein said internal sleeve recess includes
an inner cylindrical surface and a pair of tapered end surfaces which are tapered to diverge inwardly, and
said insert body includes
inner surfaces diverging outwardly at the sides of the ribs, end faces converging outwardly and outer surfaces which diverge outward,
said body being initially formed into partial engagement with said sleeve recess.

13. A tubular joint according to claim 12 wherein
said body is deformed into said sleeve recess during pressure forming of said inner tubular member so that its end faces engage the tapered end faces of said sleeve recess and its outer surfaces engage the cylindrical surface of said sleeve recess.

* * * * *